United States Patent
Smith et al.

(10) Patent No.: US 11,149,614 B2
(45) Date of Patent: Oct. 19, 2021

(54) SYSTEMS AND METHOD FOR EXHAUST WARM-UP STRATEGY

(71) Applicant: Ford Global Technologies, LLC, Dearborn, MI (US)

(72) Inventors: Jason Ronald Smith, Canton, MI (US); Michael Brendan Hopka, Milford, MI (US); Devesh Upadhyay, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 177 days.

(21) Appl. No.: 16/547,457

(22) Filed: Aug. 21, 2019

(65) Prior Publication Data

US 2019/0376431 A1     Dec. 12, 2019

Related U.S. Application Data

(62) Division of application No. 15/868,020, filed on Jan. 11, 2018, now Pat. No. 10,450,930, which is a
(Continued)

(51) Int. Cl.
*F01N 9/00* (2006.01)
*B60W 50/00* (2006.01)
(Continued)

(52) U.S. Cl.
CPC .................. *F01N 9/00* (2013.01); *B60K 6/24* (2013.01); *B60W 20/10* (2013.01); *B60W 20/16* (2016.01);
(Continued)

(58) Field of Classification Search
CPC ................................ F01N 9/00; B60W 20/16
See application file for complete search history.

(56) References Cited

U.S. PATENT DOCUMENTS

| 4,215,541 A | 8/1980 | Tanaka et al. |
| 4,270,347 A | 6/1981 | Fukuba et al. |

(Continued)

FOREIGN PATENT DOCUMENTS

| CN | 101506021 A | 8/2009 |
| CN | 103732874 A | 4/2014 |

(Continued)

OTHER PUBLICATIONS

National Intellectual Property Administration of the People's Republic of China, Office Action and Search Report Issued in Application No. 201611002880.1, dated Dec. 3, 2019, 10 pages. (Submitted with Partial Translation).

*Primary Examiner* — Jess Whittington
(74) *Attorney, Agent, or Firm* — Geoffrey Brumbaugh; McCoy Russell LLP

(57) ABSTRACT

Methods and systems are provided for controlling a vehicle engine to adjust exhaust warm-up strategy based on a vehicle network information. In one example, in response to an expected decrease in temperature of a catalyst of a vehicle below a threshold and an estimated duration thereof based on communications external from the vehicle, a method may include delaying catalyst heating actions, when the catalyst heating actions are determined to be unable to heat up the catalyst to threshold temperatures. However, the catalyst heating actions may be enabled when the catalyst heating actions are determined to be able to achieve the threshold temperature within the duration.

6 Claims, 8 Drawing Sheets

Related U.S. Application Data division of application No. 14/938,625, filed on Nov. 11, 2015, now Pat. No. 9,932,876.

(51) Int. Cl.

| | | |
|---|---|---|
| *B60W 20/10* | (2016.01) | |
| *B60W 20/16* | (2016.01) | |
| *B60K 6/24* | (2007.10) | |
| *B60W 20/40* | (2016.01) | |
| *F01N 3/021* | (2006.01) | |
| *F01N 3/10* | (2006.01) | |
| *F01N 3/20* | (2006.01) | |
| *F01N 11/00* | (2006.01) | |
| *B60W 20/00* | (2016.01) | |

(52) U.S. Cl.
CPC ........ *B60W 20/40* (2013.01); *B60W 50/0097* (2013.01); *F01N 3/021* (2013.01); *F01N 3/101* (2013.01); *F01N 3/103* (2013.01); *F01N 3/2006* (2013.01); *F01N 3/2066* (2013.01); *F01N 11/002* (2013.01); *B60W 20/00* (2013.01); *B60W 2510/244* (2013.01); *B60W 2530/14* (2013.01); *B60W 2540/06* (2013.01); *B60W 2554/00* (2020.02); *B60W 2556/50* (2020.02); *B60W 2556/65* (2020.02); *B60Y 2200/92* (2013.01); *B60Y 2300/472* (2013.01); *B60Y 2300/474* (2013.01); *F01N 2900/10* (2013.01); *Y10S 903/905* (2013.01)

(56) References Cited

U.S. PATENT DOCUMENTS

| | | | |
|---|---|---|---|
| 4,458,484 A | 7/1984 | Toryu et al. | |
| 5,463,551 A | 10/1995 | Milunas | |
| 5,727,383 A | 3/1998 | Yamashita et al. | |
| 5,867,987 A | 2/1999 | Halimi et al. | |
| 6,641,505 B2 | 11/2003 | Sayman et al. | |
| 7,707,821 B1 | 5/2010 | Legare | |
| 7,725,238 B2 | 5/2010 | Perkins | |
| 8,229,649 B2 | 7/2012 | Akihisa | |
| 8,863,497 B1 | 10/2014 | Legare | |
| 9,233,605 B2 | 1/2016 | Hijikata | |
| 9,732,646 B2 | 8/2017 | Upadhyay et al. | |
| 2002/0029564 A1 | 3/2002 | Roth et al. | |
| 2002/0172633 A1 | 11/2002 | Koermer et al. | |
| 2002/0187303 A1 | 12/2002 | Kato et al. | |
| 2004/0020359 A1 | 2/2004 | Koermer et al. | |
| 2004/0177833 A1 | 9/2004 | Murase et al. | |
| 2007/0000274 A1 | 1/2007 | Li | |
| 2007/0135984 A1 | 6/2007 | Breed et al. | |
| 2007/0156317 A1 | 7/2007 | Breed | |
| 2008/0255742 A1 | 10/2008 | Morisset et al. | |
| 2009/0227417 A1 | 9/2009 | Imamura et al. | |
| 2010/0004844 A1 | 1/2010 | Hirooka | |
| 2010/0043404 A1* | 2/2010 | Hebbale | F01N 9/00 60/286 |
| 2010/0107608 A1* | 5/2010 | Mitsutani | B60L 50/16 60/285 |
| 2010/0152938 A1 | 6/2010 | Aoki et al. | |
| 2010/0305830 A1 | 12/2010 | Santoso et al. | |
| 2010/0318281 A1 | 12/2010 | Santoso et al. | |
| 2011/0270511 A1 | 11/2011 | Kurtz | |
| 2012/0035791 A1 | 2/2012 | Bottlang et al. | |
| 2012/0150374 A1* | 6/2012 | Yamazaki | B60K 6/365 701/22 |
| 2013/0180510 A1 | 7/2013 | Makki et al. | |
| 2014/0034008 A1 | 2/2014 | Mehring et al. | |
| 2014/0219896 A1 | 8/2014 | Holbert et al. | |
| 2014/0288736 A1* | 9/2014 | Martin | B60W 20/00 701/22 |
| 2014/0295749 A1 | 10/2014 | Hijikata | |
| 2015/0025721 A1 | 1/2015 | Thompson et al. | |
| 2015/0032345 A1 | 1/2015 | Lochocki, Jr. et al. | |
| 2015/0083092 A1 | 3/2015 | Desai | |
| 2015/0083093 A1 | 3/2015 | Desai | |
| 2015/0152817 A1 | 6/2015 | Roth et al. | |
| 2015/0203100 A1 | 7/2015 | Whitney et al. | |
| 2015/0241880 A1 | 8/2015 | Kim et al. | |
| 2015/0275787 A1* | 10/2015 | Dufford | B60W 30/188 701/102 |
| 2015/0354426 A1 | 12/2015 | Crawford et al. | |
| 2015/0369157 A1 | 12/2015 | Lehmen et al. | |
| 2016/0035157 A1 | 2/2016 | Willard et al. | |
| 2016/0068103 A1 | 3/2016 | McNew et al. | |
| 2016/0146334 A1 | 5/2016 | Nelson et al. | |
| 2016/0214602 A1 | 7/2016 | Takara et al. | |
| 2017/0080919 A1* | 3/2017 | Follen | F02N 11/0837 |
| 2017/0107920 A1 | 4/2017 | Roth et al. | |
| 2017/0114748 A1 | 4/2017 | Roth et al. | |
| 2017/0219508 A1 | 8/2017 | Lana et al. | |
| 2018/0266292 A1* | 9/2018 | Snow | F01N 3/021 |
| 2018/0334170 A1 | 11/2018 | Liu et al. | |

FOREIGN PATENT DOCUMENTS

| | | |
|---|---|---|
| CN | 104061083 A | 9/2014 |
| JP | H11270327 A | 10/1999 |
| JP | 2000240431 A | 9/2000 |
| WO | 2008059944 A1 | 5/2008 |
| WO | 2011077125 A1 | 6/2011 |

* cited by examiner

SYSTEMS AND METHOD FOR EXHAUST WARM-UP STRATEGY

CROSS REFERENCE TO RELATED APPLICATION

The present application is a divisional of U.S. Non-Provisional patent application Ser. No. 15/868,020, entitled "SYSTEMS AND METHOD FOR EXHAUST WARM-UP STRATEGY," and filed on Jan. 11, 2018. U.S. Non-Provisional patent application Ser. No. 15/868,020 claims priority to U.S. Non-Provisional patent application Ser. No. 14/938,625, entitled "SYSTEMS AND METHOD FOR EXHAUST WARM-UP STRATEGY," and filed on Nov. 11, 2015, now U.S. Pat. No. 9,932,876. The entire contents of each of the above-referenced applications are hereby incorporated by reference for all purposes.

FIELD

The present description relates generally to methods and systems for controlling a vehicle engine to adjust exhaust warm-up strategy based on a vehicle network information.

BACKGROUND/SUMMARY

Diesel and gasoline vehicle exhaust systems may include one or more catalytic and/or emissions storage devices. As such, each device may operate at an optimal temperature (also known as the light-off temperature) and various heating actions may be taken in the powertrain to deliver heat to the exhaust system in order to heat the device to its optimal operating temperature. The heating actions may include (but not limited to) delaying combustion with injection or spark timing, changing exhaust gas recirculation (EGR) rate, delaying transmission shift point, and increasing engine load with accessory loads and the like.

Each of these aforementioned heating actions may negatively affect vehicle fuel economy and may have a noticeable impact on the driver experience. Further, certain drive conditions (like extended idle, for example) may not allow enough heat to get to the exhaust system to light-off the active exhaust components even with the intrusive powertrain actions mentioned above. During such driving conditions, any action taken to warm the exhaust is wasted because it may not yield the desired emissions reduction implying that fuel economy is reduced and the driver may be negatively impacted for no net benefit.

One example is shown by Bergeal et al. in WO 2011077125 A1, wherein a diesel engine includes a catalyst, and an engine management system that detects idle condition, and stops the engine entirely. The catalyst design incorporates a honeycomb substrate and is further coated with a catalytic washcoat and is arranged such that it may be able balance the demands of the low catalyst light-off temperature to treat cold-start emissions. However, the design of the catalyst is such that it may be limited to a particular engine system, diesel engines fitted with start/stop technology, for example.

The inventors have recognized the above issues and identified an interactive approach that may address the issue of drive condition related catalyst heating actions across different types of vehicle systems. In one example, the issues above may be address by a method comprising adjusting catalyst heating actions in response to an expected decrease in temperature of a catalyst of a vehicle below a threshold and an estimated duration thereof based on communications external from the vehicle, including delaying the actions based on the actions determined to be unable to achieve the threshold within the duration, and enabling the actions based on the actions determined to be able to achieve the threshold within the duration. Thus, by anticipating drive conditions wherein the exhaust cannot be warmed to operating temperature, intrusive exhaust warm-up actions may be delayed or in some cases inhibited, until a more favorable driving condition occurs.

As an example, a current and a future driving condition may be determined based on a communication within a vehicle-to-vehicle (V2V) network formed between vehicles within a threshold distance of a target vehicle and further communication with a cloud. Additionally, a driver destination information may be determined either from an in vehicle navigation system or from the navigation system of a blue tooth device. Based on the driving condition, a target vehicle may be able to avail of information from a lead network of vehicles to make intelligent decisions related to whether or not to take intrusive actions to maintain or increase exhaust temperature. In this way, an optimal strategy may be devised that continuously monitors fuel cost of heating and the impact to the driver versus delaying catalyst heating until more favorable conditions exist.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
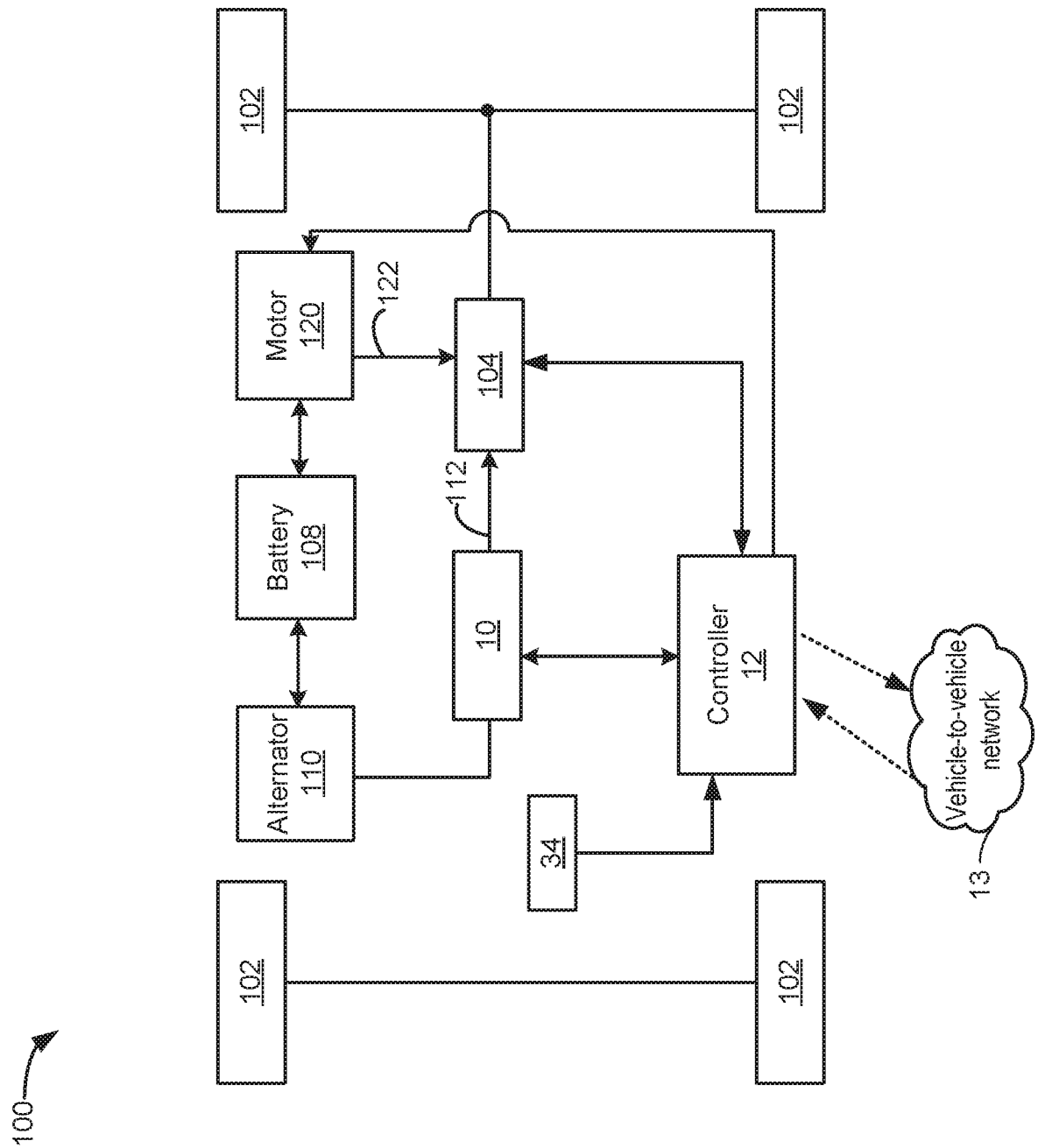
FIG. 1 shows a schematic depiction of a vehicle system.
Figure 2:
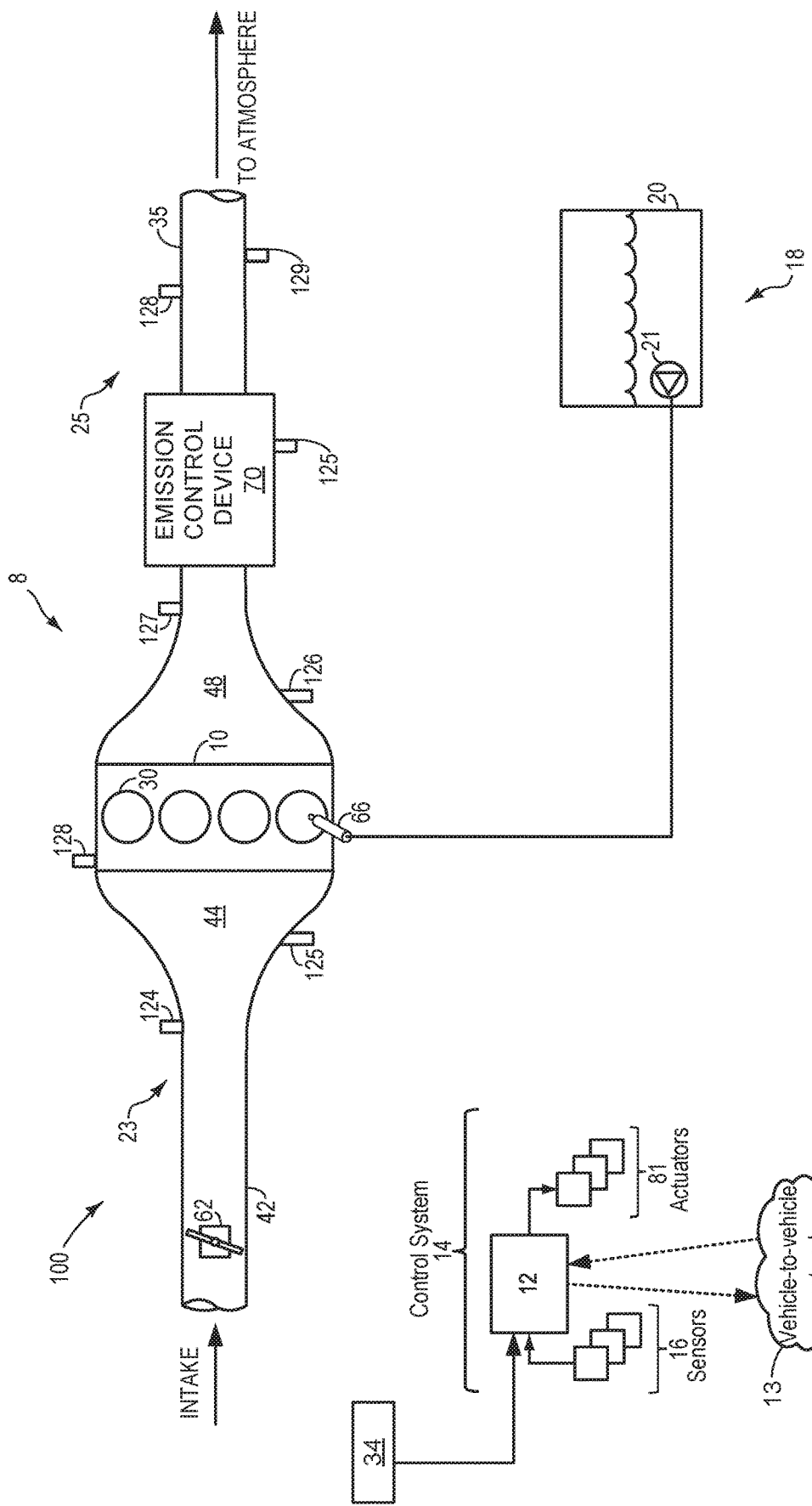
FIG. 2 schematically shows an engine system.
Figure 7:
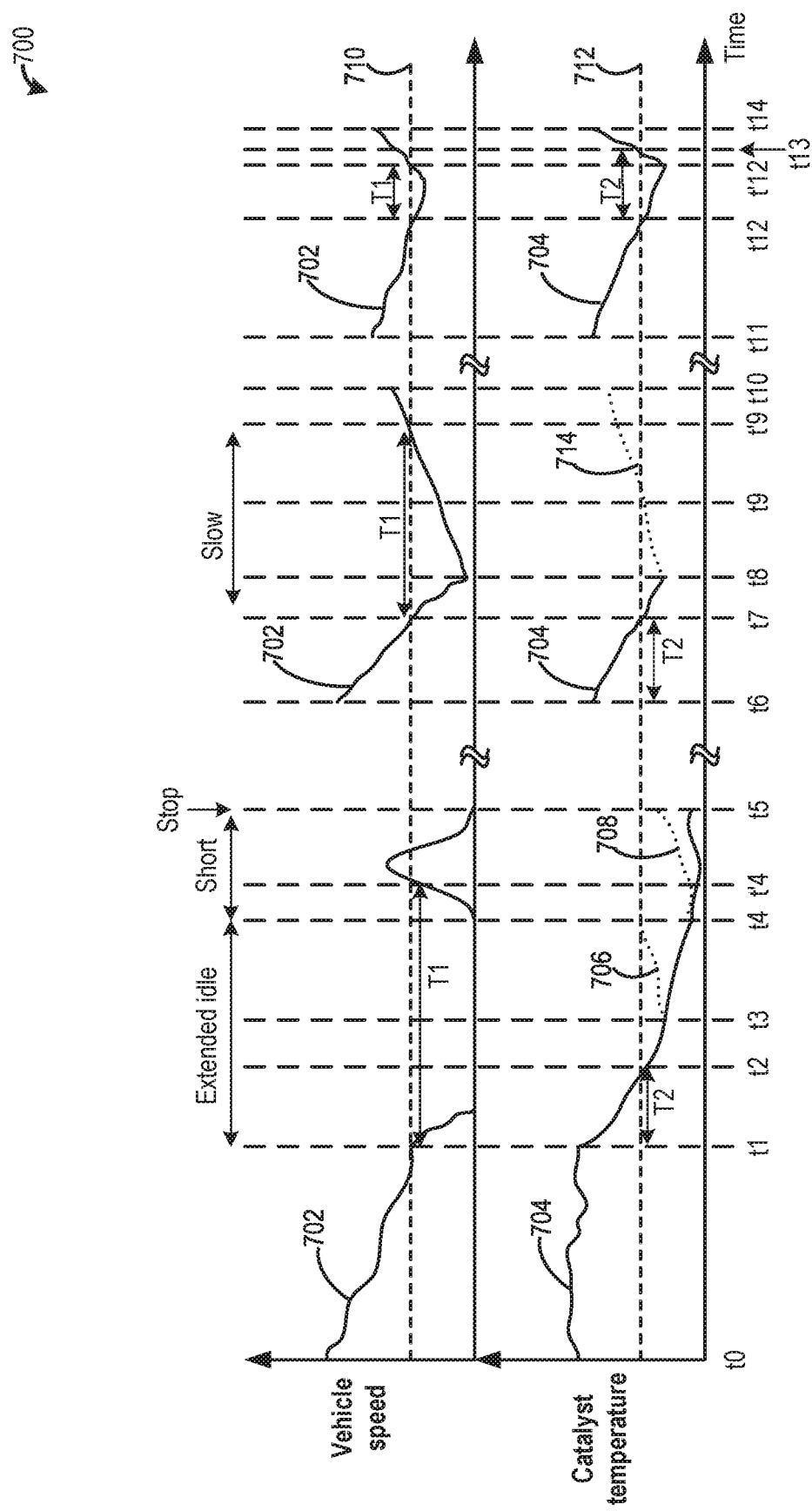
FIG. 7 shows an example relationship between vehicle speed and catalyst temperature.
Figure 8:
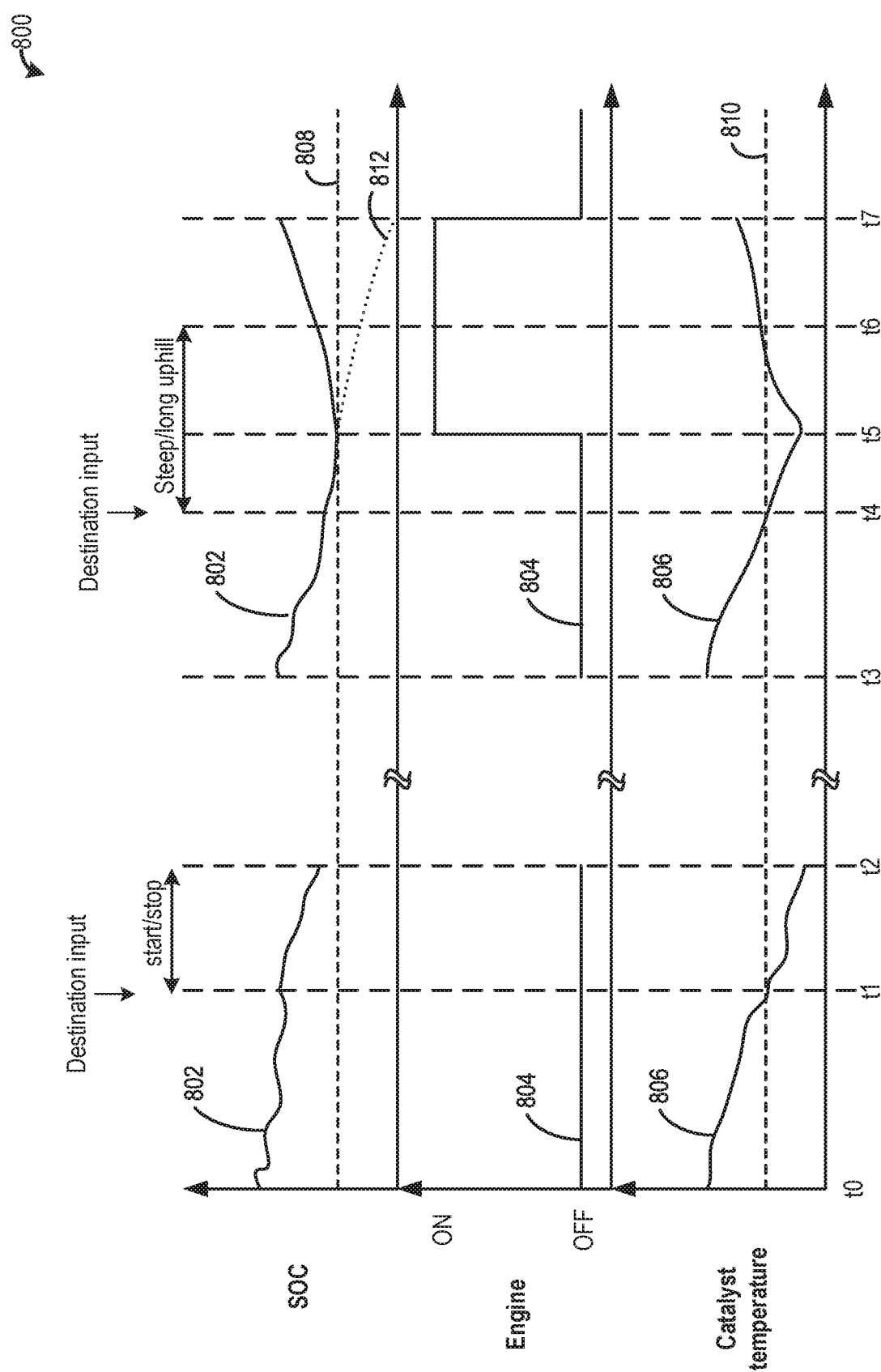
FIG. 8 shows an example relationship between a state of charge in the hybrid electric vehicle and operating an engine of the hybrid vehicle based on the catalyst temperature.

The following description relates to systems and methods for controlling exhaust catalyst heating actions. An example vehicle system including a hybrid drive is depicted in FIG. 1 and an example engine system is shown in FIG. 2. The present description may provide benefits for gasoline, diesel and alternative fuel engines as well. Accordingly, this disclosure is not limited to a particular type of engine or a particular exhaust system configuration. As such, the vehicle system may include a navigation system, which may be in communication with a network cloud, a fleet of vehicles and with a controller of the vehicle system to ascertain a present driving condition of the vehicle and further predict a future driving condition. Certain drive conditions may not allow enough heat to get the exhaust system to activate exhaust components. The controller may be configured to perform a control routine, such as the routine of FIG. 4 to identify such drive conditions and further delay exhaust warm up actions. In one example, if a vehicle speed falls below threshold and continues to stay below threshold for a certain duration (extended idle condition, for example), the controller may perform a routine such as the routine of FIG. 5 to delay the catalyst heating actions. An example relationship between a vehicle speed and catalyst temperatures is shown in FIG. 7. In another example, the controller may control exhaust warm-up based on a predicted number of start/stop in a route planned for a hybrid vehicle based on a destination input by a driver of the vehicle by performing the routine shown in FIG. 6. An example relationship between a state of charge in the hybrid electric vehicle and operating an engine of the vehicle based on the catalyst temperature is shown in FIG. 8. In this way, by anticipating drive conditions wherein the exhaust may not be warmed up to operating temperature, and delaying or stopping the intrusive exhaust warm-up actions, driver experience may be enhanced and further cost of heating may be reduced.

FIG. 1 illustrates an example vehicle propulsion system 100. Vehicle propulsion system 100 includes a fuel burning engine 10 and a motor 120. As a non-limiting example, engine 10 comprises an internal combustion engine and motor 120 comprises an electric motor. Motor 120 may be configured to utilize or consume a different energy source than engine 10. For example, engine 10 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 includes wheels 102. Torque is supplied to wheels 102 via engine 10 and transmission 104. In some embodiments, motor 120 may also provide torque to wheels 102.

Vehicle propulsion system 100 may utilize a variety of different operational modes depending on operating conditions encountered by the vehicle propulsion system. Some of these modes may enable engine 10 to be maintained in an off state where combustion of fuel at the engine is discontinued. For example, under select operating conditions, motor 120 may propel the vehicle via transmission 104 as indicated by arrow 122 while engine 10 is deactivated.

During other operating conditions, motor 120 may be operated to charge an energy storage device such as battery 108. For example, motor 120 may receive wheel torque from transmission 104 as indicated by arrow 122 where the motor may convert the kinetic energy of the vehicle to electrical energy for storage at battery 108. Thus, motor 120 can provide a generator function in some embodiments. However, in other embodiments, alternator 110 may instead receive wheel torque from transmission 104, or energy from engine 10, where the alternator 110 may convert the kinetic energy of the vehicle to electrical energy for storage at battery 108.

During still other operating conditions, engine 10 may be operated by combusting fuel received from a fuel system (not shown in FIG. 1). For example, engine 10 may be operated to propel the vehicle via transmission 104 as indicated by arrow 112 while motor 120 is deactivated. During other operating conditions, both engine 10 and motor 120 may each be operated to propel the vehicle via transmission 104 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first drive system and engine 10 may propel the vehicle via a second drive system.

Operation in the various modes described above may be controlled by a controller 12. For example, controller 12 may identify and/or control the amount of electrical energy stored at the energy storage device, which may be referred to as the state of charge (SOC). Controller 12 will be described below in more detail with respect to FIG. 2.

FIG. 2 shows a schematic depiction of additional components of vehicle propulsion system 100. The vehicle system 100 includes an engine system 8, a control system 14, and a fuel system 18. The engine system 8 may include an engine 10 having a plurality of cylinders 30. The engine 10 includes an engine intake 23 and an engine exhaust 25. The engine intake 23 includes a throttle 62 fluidly coupled to the engine intake manifold 44 via an intake passage 42. The engine exhaust 25 includes an exhaust manifold 48 leading to an exhaust passage 35 that routes exhaust gas to the atmosphere. The engine exhaust 25 may include one or more emission control devices 70, which may be mounted in a close-coupled position in the exhaust. One or more emission control devices may include a three-way catalyst, selective catalytic reduction (SCR) system, lean NOx trap, diesel particulate filter (DPF), oxidation catalyst, etc. Emission control device 70 may utilize reducants in the exhaust stream, such as urea or unburnt fuel, to reduce substrates such as NOx and CO in the exhaust. As such, emission control device 70 may include a reductant injector. In other embodiments, reducants may be introduced via a fuel injection system in the engine. It will be appreciated that other components may be included in the engine such as a variety of valves and sensors.

Fuel system 18 may include a fuel tank 20 coupled to a fuel pump system 21. The fuel pump system 21 may include one or more pumps for pressurizing fuel delivered to the injectors of engine 10, such as the example injector 66 shown. While only a single injector 66 is shown, additional injectors are provided for each cylinder. It can be appreciated that fuel system 18 may be a return-less fuel system, a return fuel system, or various other types of fuel system.

The fuel tank 20 may hold a plurality of fuel blends, including fuel with a range of alcohol concentrations, such as various gasoline-ethanol blends, including E10, E85, gasoline, diesel, etc., and combinations thereof.

The vehicle system 100 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 and temperature sensor 127 located upstream of the emission control device, and airflow sensor, exhaust gas sensor 128, and temperature sensor 129 located downstream of the emission control device. Other sensors such as pressure, temperature, air/fuel ratio, and composition sensors may be coupled to various locations in the vehicle system 100. Some more sensors include catalyst temperature sensors 125 coupled to one or more catalysts coupled to the exhaust system. As another example, the actuators may include fuel injector 66 and throttle 62. In addition, controller 12 may receive data from a navigation device 34 (such as GPS) and/or a vehicle-to-vehicle (V2V) network such as an off-board cloud network 13.

The control system 14 may include a controller 12 comprising a computer readable storage medium comprising instructions that may be executed to carry out one more control routines. The controller may receive input data from the various sensors, process the input data, and trigger the actuators in response to the processed input data based on instruction or code programmed therein corresponding to one or more routines. Example control routines are described herein with regard to FIGS. 4-6.

The efficiency of an exhaust-gas aftertreatment device is dependent upon the operating temperature of the exhaust-gas aftertreatment device. Typically, in gasoline engines, catalytic reactors may use catalytic materials which increase the rate of certain reactions, ensuring an oxidation of HC and CO even at low temperatures. If nitrogen oxides (NOx) are additionally to be reduced, this may be achieved through the use of a three-way catalytic converter. Herein, the nitrogen oxides NOx are reduced by means of the non-oxidized exhaust-gas components which are present, specifically the carbon monoxides and the unburned hydrocarbons, wherein said exhaust-gas components are oxidized at the same time.

In combustion engines which are operated with an excess of air, that is to say for example engines which operate in the lean-burn mode, but in particular direct-injection diesel engines or also direct-injection engines, the nitrogen oxides contained in the exhaust gas cannot be reduced out of principle, that is to say on account of the lack of reducing agent.

For the oxidation of the unburned hydrocarbons and of carbon monoxide, provision is made in particular of an oxidation catalytic converter in the exhaust-gas flow. To realize an adequate conversion, a certain operating temperature is demanded. The so-called light-off temperature may be 120° C. to 250° C.

To reduce the nitrogen oxides, use is also made of selective catalytic converters, so-called SCR catalytic converters, in which reducing agent is purposely introduced into the exhaust gas in order to selectively reduce the nitrogen oxides. As reducing agent, in addition to ammonia and urea, use may also be made of unburned hydrocarbons. The latter is also referred to as HC enrichment, with the unburned hydrocarbons being introduced directly into the exhaust tract or else being supplied by means of engine-internal measures, specifically by means of a post-injection of additional fuel into the combustion chamber after the actual combustion.

It is basically also possible to reduce the nitrogen oxide emissions by means of so-called nitrogen oxide storage catalytic converters. Here, the nitrogen oxides are initially absorbed, that is to say collected and stored, in the catalytic converter during a lean-burn mode of the combustion engine before being reduced during a regeneration phase for example by means of substoichiometric operation (for example $\lambda<0.95$) of the combustion engine with a lack of oxygen.

Further possible engine-internal measures for realizing rich, that is to say substoichiometric operation of the combustion engine are exhaust-gas recirculation and, in the case of diesel engines, throttling in the intake tract. It is possible to dispense with engine-internal measures if the reducing agent is introduced directly into the exhaust tract, for example by means of an injection of additional fuel. During the regeneration phase, the nitrogen oxides are released and converted substantially into nitrogen dioxide (N2), carbon dioxide (CO2) and water (H2O). The frequency of the regeneration phases is determined by the overall emissions of nitrogen oxides and the storage capacity of the nitrogen oxide storage catalytic converter.

The temperature of the storage catalytic converter typically lies within a temperature window between 200° C. and 450° C., such that firstly a fast reduction of the nitrogen oxides is ensured and secondly no desorption without conversion of the re-released nitrogen oxides takes place, such as may be triggered by excessively high temperatures.

One difficulty in the use of the storage catalytic converter in the exhaust track arises from the sulfur contained in the exhaust gas, which sulfur is likewise absorbed in the storage catalytic converter and may be regularly removed by means of a desulfurization. For this purpose, the storage catalytic converter may be heated to high temperatures, usually of between 600° C. and 700° C., and supplied with a reducing agent, which in turn can be attained by means of a transition to rich operation of the combustion engine. The higher the temperature of the storage catalytic converter is, the more effective the desulfurization is, wherein an admissible maximum temperature may not be exceeded, because then the desulfurization of the storage catalytic converter contributes significantly to the thermal aging of the storage catalytic converter as a result of excessively high temperatures. This adversely affects the desired conversion of the nitrogen oxides toward the end of the service life of the catalytic converter, wherein in particular the thermal storage capacity decreases as a result of thermal aging.

To minimize the emissions of soot particles, use is made of so-called regenerative particle filters which filter the soot particles out of the exhaust gas and store them, with said soot particles being burned off intermittently during the course of the regeneration of the filter, usually at high temperatures of around 550° C. Here, the regeneration intervals are determined inter alia by the exhaust-gas back pressure, which is generated as a result of the increasing flow resistance of the filter on account of the increasing particle mass in the filter.

Since both the exhaust gases of gasoline engines and also the exhaust gases of diesel engines contain unburned hydrocarbons (HC), carbon monoxide (CO), nitrogen oxides (NOx) and also soot particles—albeit in different quantities and qualities—use is generally made of combined exhaust-gas aftertreatment devices which comprise one or more of the above-described catalytic converters and/or filters.

The increasing use of hybrid drives, in which conventionally in each case a combustion engine and an electric motor provide an output power, for example for driving a motor vehicle, offers completely new possibilities for the control of exhaust-gas aftertreatment devices, in particular with regard to optimum exhaust-gas purification or conversion performance under different operating conditions.

For efficient control, it is advantageous for suitable measurement devices, for example temperature sensors and/or flow sensors and/or sensors for determining chemical substances or elements contained in the exhaust-gas flow, to be provided in or near the exhaust-gas treatment device, in particular upstream and/or downstream of the exhaust-gas aftertreatment device as viewed in the exhaust-gas flow direction. It is thereby possible to determine the temperature window suitable for the respective optimum operation of the exhaust-gas aftertreatment device, and if appropriate to adapt or change said temperature window to certain operating states of the exhaust-gas aftertreatment device, for example for the regeneration of a soot particle filter and/or of a nitrogen oxide storage catalytic converter.

As described earlier, the diesel and gasoline engines include one or more catalytic and/or emissions storage device. Each of these devices may function at high operating temperatures. To expedite the function of these devices various actions may be taken in the powertrain to deliver heat to the exhaust system including (but not limited to) delaying combustion with injection or spark timing, changing exhaust gas recirculation rate, delaying transmission shift point, and increasing engine load with accessory loads and the like. In case of hybrid vehicles, a combustion engine of the hybrid vehicle may be turned ON to facilitate catalyst warm-up, for example. However, each action may negatively affect vehicle fuel economy and may further have a noticeable impact on the driver experience.

Certain drive conditions, however, do not allow enough heat to get to the exhaust system to light-off the active exhaust components even with the intrusive powertrain actions mentioned above. During extended engine idle, for example, any action taken to warm the exhaust may be wasted as it may not yield the desired emissions reduction. Herein, fuel economy may be reduced and the driver may be negatively impacted for no net benefit. The inventors have recognized that it may desirable to anticipate such drive conditions based on one or more of a vehicle-to-vehicle (V2V) network, navigation data and drive history. By predicting the drive conditions in advance, exhaust warm-up actions may be delayed when the exhaust cannot be warmed to operating temperature or enabled when exhaust may be able to reach the operating temperature.

Figure 3:
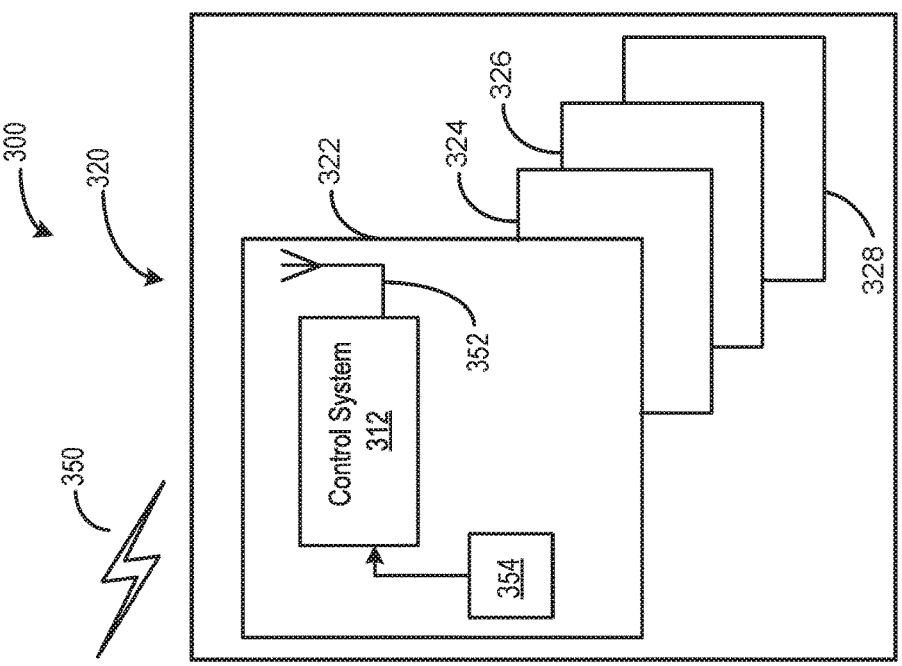
FIG. 3 shows an example embodiment of the vehicle system comprising a navigation system, in communication with an external network and a fleet of vehicles.
Figure 3:
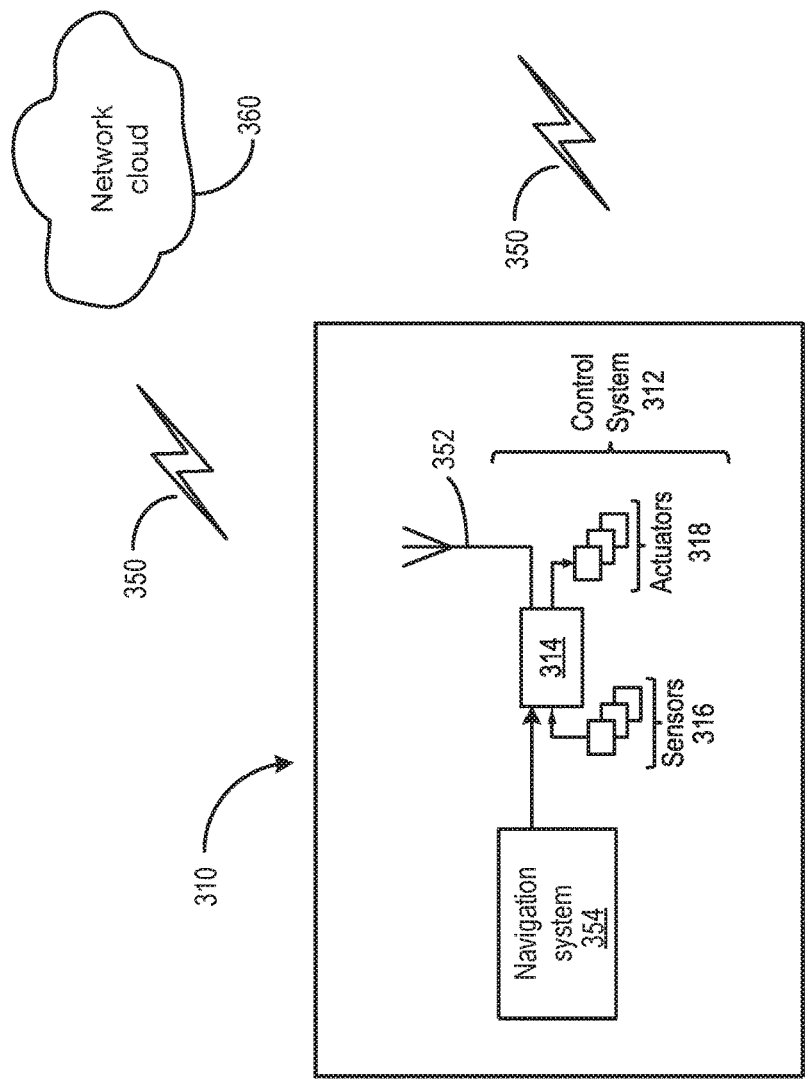

Thus, a target vehicle may be able to obtain information from a lead network of vehicles to make intelligent decisions related to whether or not to take intrusive actions to maintain or increase exhaust temperature. FIG. 3 shows a vehicle in communication with a network cloud and other vehicles in a fleet operating within a certain radius. In an embodiment 300 of a vehicle system 310, the vehicle system 310 may be in communication with an external network (cloud) 360 and a fleet of vehicles 320.

The vehicle system 310 may include a vehicle control system 312 that may further include a controller 314. The control system 312 may be an example of the control system 14 of FIG. 2. The controller 314 may be an example of the controller 12 of FIGS. 1 and 2 and may further perform one or more methods described herein in some embodiments. A navigation system 354 may be coupled to the control system 312 to determine location of the vehicle 310 at key-on and at any other instant of time. The navigation system 354 may be configured as a component of a motor vehicle navigation system, as a handheld device, as a component of a smart phone, and/or as any other suitable computing device(s). At a vehicle key-off, the last location (e.g., GPS co-ordinates of the vehicle) of the vehicle 310 as estimated by the navigation system 354 may be stored by the control system 312 for use during the next key-on event. The navigation system may be connected to an external server and/or network cloud or cloud-based server 360 via wireless communication 350. The controller 314 may be able to run an application for connecting to a cloud-based server 360 and/or collecting information for transmission to the cloud-based server 360. The application may retrieve information gathered by vehicle systems/sensors, input devices, devices such as a mobile device connected via a Bluetooth link, and the like. The navigation system 354 may determine the current location of the vehicle 310 and obtain ambient condition data (such as temperature, pressure etc.) from a network cloud 360. The network cloud 360 may include real-time traffic condition road condition, vehicle speed of target vehicle, average vehicle speed of vehicles in the network, and the like. The controller 312 may be coupled to a wireless communication device 352 for direct communication of the vehicle 310 with a network cloud 360. Using the wireless communication device 352, the vehicle 310 may retrieve ambient condition data (such as temperature, pressure etc.) from the network cloud 360 to determine one or more of a current driving condition and a future driving condition.

Control system 312 is shown receiving information from a plurality of sensors 316 and sending control signals to a plurality of actuators 318. As one example, sensors 316 may include manifold absolute pressure Intake air temperature (IAT) sensor, outside air temperature (OAT) sensor (MAP) sensor, barometric pressure (BP) sensor, exhaust gas oxygen sensor (such as a UEGO sensor), fuel tank pressure sensor, canister temperature sensor, catalyst temperature, vehicle speed and the like. Based on signals received from the different sensors 316, the engine operations are regulated and consequently the controller 314 sends control signals to engine actuators 318.

A fleet 320 of vehicles is shown in FIG. 3. A fleet 320 may comprise of multiple vehicles 322, 324, 326, and 328. In one example, vehicles 322-328 may each be similar in make and model to the vehicle 310. In alternate examples, vehicles 322-328 may be vehicles within a threshold distance of vehicle 310. Further still, vehicles 322-328 may be vehicles that are part of a common fleet as vehicle 310. Each vehicle of the fleet 320 may comprise a control system 312 similar to the control system 312 of vehicle 310. A navigation system 354 and a wireless communication device 352 may be coupled to the control system 312 of each vehicle in the fleet 320. The on-board controllers in the vehicles in the fleet may communicate with each other and to the on-board controller in vehicle 310 via their respective navigation system 354, via wireless communication device 352, and/or via other forms of vehicle to vehicle technology (V2V). The vehicles in the fleet 320 may also communicate with the network cloud 360 via wireless communication 350.

Vehicle 310 may retrieve ambient (such as temperature, humidity etc.) and engine operating (such as catalyst temperature, speed) conditions from one or more vehicles in the fleet 320. In one example, the fleet 320 is within a threshold radius of the vehicle 310, the ambient conditions experienced by each of the vehicles in the fleet may be similar to that experienced by the vehicle 310. The threshold radius may be defined as a distance within which the ambient and consequently engine operating conditions may be considered to be similar to those of vehicle 310. A statistical weighted average of the estimate retrieved from each vehicle of the remote fleet of vehicles and the estimate retrieved from the network cloud may be used by the control system 312 of vehicle 310 to determine the future driving condition of the vehicle 310. For example, when the average vehicle speed of fleet 320 is lever than a threshold (5 mph, for example), and has continued to remain under the threshold for a certain duration, it may be determined that the vehicle 310 may encounter slow moving traffic or stopped vehicles in the future. As such, the navigation system 354 may be able to deter nine the traffic conditions, and estimate a time for which the condition may persist. In this way the vehicle 310 may communicate with remote sources (external network cloud, other vehicles) using one or multiple technologies e.g., wireless communication, navigation system and V2V. Various kinds of data (such as ambient temperature, humidity conditions, vehicle speed, traffic) may be exchanged among the vehicles and the network cloud and this data may be utilized for enabling or delaying catalyst heating actions as described in FIGS. 4-6.

The controller 12 of FIGS. 1 and 2, and the controller 314 of FIG. 3 receive signals from the various sensors of FIGS. 1, 2 and 3 and employs the various actuators of FIGS. 1, 2 and 3 to adjust engine operation based on the received signals and instructions stored on a memory of the controller. Instructions for carrying out method 400 and the rest of the methods 500 and 600 included herein may be executed by a controller based on instructions stored on a memory of the controller and in conjunction with signals received from sensors of the engine system, such as the sensors described above with reference to FIGS. 1, 2 and 3. The controller may employ engine actuators of the engine system to adjust engine operation, according to the methods described below.

Figure 4:
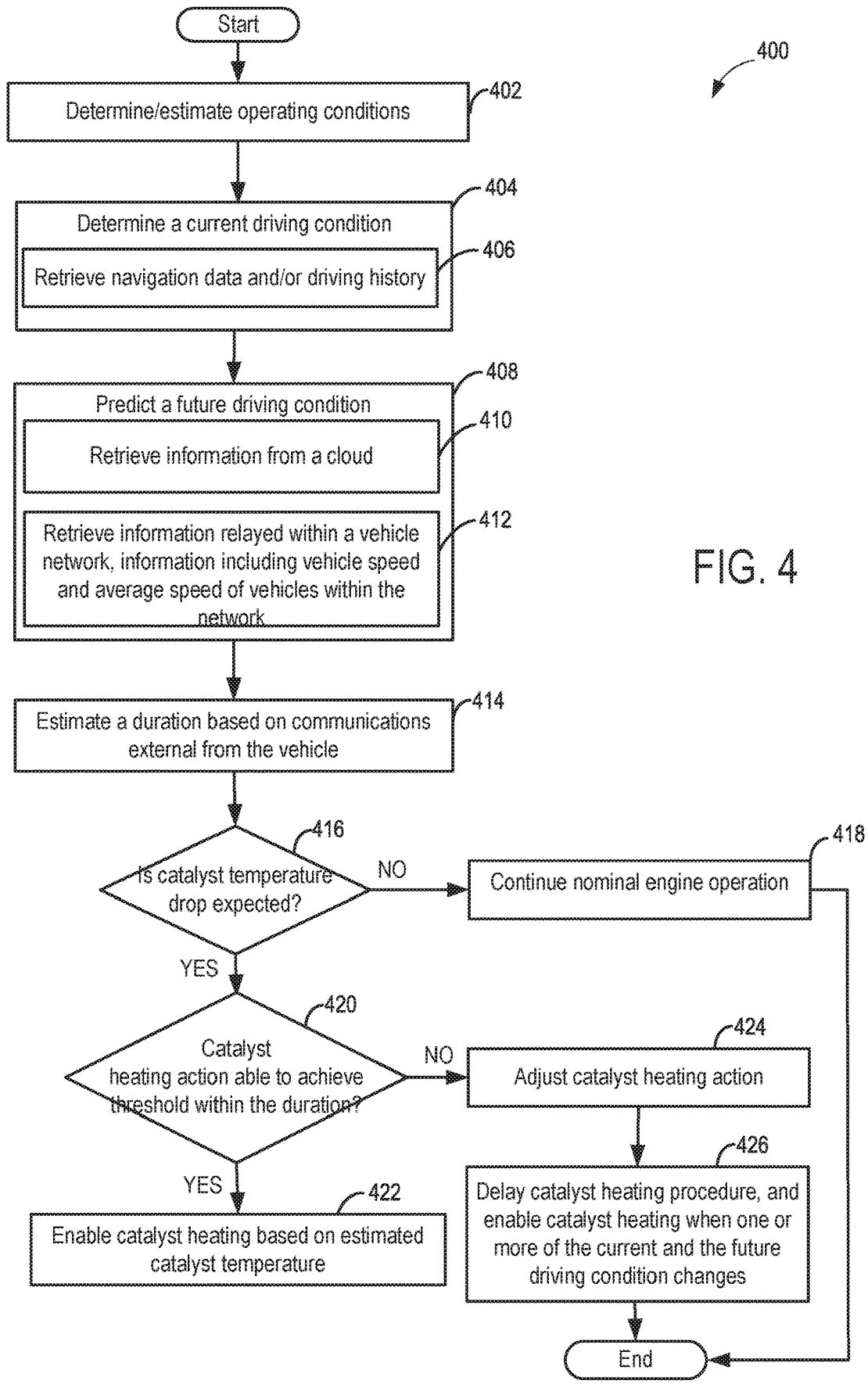
FIG. 4 shows a flow chart illustrating an example method for adjusting catalytic heating actions based on the actions are determined to be able to heat up the catalyst to threshold temperature.

Turning now to FIG. 4, an example method 400 for delaying catalytic heating actions when the actions are determined to be unable to achieve threshold temperature within a threshold duration. Specifically, the method predicts drive conditions wherein catalyst light-off temperatures may not be reached, and delays performing catalyst heating actions during such drive conditions.

Method 400 begins at 402 where vehicle operating conditions are determined and/or estimated. Operating conditions may include engine operating conditions such as engine speed, engine load, intake air flow rate and/or pressure, throttle position, accelerator pedal position, ambient pressure, ambient temperature, speed, exhaust temperature, and the like. The operating conditions further include load and/or state and temperature of on one or more emission control devices such as three-way catalyst, selective catalytic reduction (SCR) system, lean NOx trap, diesel particulate filter (DPF), oxidation catalyst, and the like. Herein, the catalyst refers to one or more catalysts and/or one or more emission storage devices in the exhaust system of diesel, gasoline, hybrid vehicles and the like. The catalyst temperature may refer to the operating or light-off temperature of the catalysts and the emission storage devices.

Method 400 then proceeds to 404 where a current driving condition is determined. For example, a current speed of the vehicle may be determined at 404. Determining the current driving conditions at 404 may further include retrieving navigation data and/or drive history at 406. For example, a current location may be determined from navigation data retrieved from the GPS. In addition, based on the current location and further based on a drive history, one or more of a destination and/or preferred route may be determined. In some examples, the destination information may be retrieved from an in-vehicle navigation system or from the navigation system of a blue tooth device. In some more examples, driver destination may be inferred from a statistical model based on drive history in conjunction with current drive parameters such as vehicle speed, current location and the like.

Next, method 400 proceeds to 408, where a future driving condition is predicted. The future driving condition may be predicted based on information retrieved from the cloud at 410 and further based on information relayed within the vehicle network at 412. As such, the cloud may share real-time traffic and road conditions data between vehicles connected in a vehicle-to-vehicle network. Information retrieved from the cloud may include a preview of upcoming traffic conditions, type of roads, accidents along the route, stalled or stopped vehicles, and the like. For example, when a long stretch of downward sloping road is detected, it may indicate a coasting condition. Information relayed within the vehicle network may include one or more of vehicle speed, an average speed of vehicles within the vehicle network, duration for which the speed is maintained, and the like. For example, when the average speed of the vehicle is less than a threshold, the threshold being 5 mph, for example, a congestion in the traffic may be deduced. In other examples, when higher average speeds are maintained for longer duration, it may indicate cruising conditions. In still other examples, when the average speed of the vehicles in the network is lower for longer period of time, then it may indicate an extended idle condition.

Method 400 then proceeds to 414 where a duration may be estimated based on communications external from the vehicle. As such, the duration may indicate the time for which the drive condition persists, for example. In the example of the future driving condition including a traffic congestion, the duration may include the time period for which the vehicle may experience the traffic congestion. Using real-time traffic data, it may be possible to predict that duration for which the traffic congestion may be present. In another example, if an average speed of the vehicles in the network increases, then again decreases wherein the speed is maintained only for a short periods of time, then it may indicate that there may be stop and go traffic up ahead, such as start/stop condition. As such, the vehicle may be predicted to enter a busy stretch of road with lots of traffic lights. In such an example, the duration or the extent to which the start/stop condition may persist may depend on the length of the road, the number of traffic stops, the duration for which a vehicle may stop at the traffic stop, traffic conditions along the stretch of road and the like.

As such, during certain driving conditions such as extended idle, for example, the exhaust temperature may be expected to decrease. As another example, during light load condition, when coasting in gear, little or no fuel may be used by the engine, and as such, exhaust temperatures may begin to decrease. During such conditions, decreasing exhaust temperatures could indicate a decreasing catalyst temperature, for example. Method 400 proceeds to 416 to determine if catalyst temperature drop is expected. Specifically, it may be determined if the catalyst temperature is expected to drop below a threshold, the threshold being the light-off temperature of the catalyst for example. During an extended idle condition, wherein the vehicle may be stopped altogether for extended periods of time, the catalyst temperature may slowly begin to decrease. Based on the duration estimated at 416, if the catalyst temperature drop is not expected to decrease below threshold during the estimated duration, then method proceeds to 418 where the engine may be operated under nominal engine operation and the method ends. Herein, the catalyst heating actions may not be adjusted, for example.

However, if a drop in catalyst temperature below the threshold is expected when checked at 416, method 400 proceeds to 420 where it may be determined if catalyst heating actions may be able to achieve threshold temperature within the duration, the threshold being the light-off temperature of the catalyst. As described earlier, diesel and gasoline vehicle exhaust systems may include one or more catalytic and/or emissions storage devices and each device may include an optimal temperature (the light-off temperature) at which it may be optimally operated. When the temperature of the device or catalyst falls below threshold, various actions may be taken in the powertrain to deliver heat to the exhaust system including (but not limited to) delaying combustion with injection or spark timing, changing exhaust gas recirculation (EGR) rate, delaying transmission shift point, and increasing engine load with accessory loads and the like.

If one or more of these actions may heat the device or catalyst to light-off temperature within the estimated duration, then method 400 proceeds to 422 where such heating actions may be enabled. However, if such heating actions may not be able to heat the device or catalyst to the light-off temperature within the duration, then method 400 proceeds to 424 where the catalyst heating action may be adjusted at 424. Adjusting catalyst heating action may further include stopping catalyst heating actions at 426. In some examples, the catalyst heating action may be delayed for a certain time until one or more of the current driving condition and the future driving condition of the vehicle changes. In this way, by anticipating drive condition wherein the heating actions may not result in exhaust being warmed up to operating temperature, intrusive heating actions to maintain or increase exhaust temperature may be avoided until a more suitable driving condition is encountered.

Thus, an example method includes adjusting catalyst heating actions in response to an expected decrease in temperature of a catalyst of a vehicle below a threshold and an estimated duration thereof based on communications external from the vehicle, including delaying the actions based on the actions determined to be unable to achieve the threshold within the duration, and enabling the actions based on the actions determined to be able to achieve the threshold within the duration. Additionally, or alternatively, the method may further include estimating the duration based on each of a current vehicle condition, and a future driving condition, the future driving condition determined based on the communications. Additionally, or alternatively, the method may further include determining the current vehicle condition based on data retrieved from a navigational database of the vehicle and a driving history. Additionally, or alternatively, the communications may include information relayed within a vehicle network and information retrieved from a cloud. Additionally, or alternatively, the vehicle network may include one or more vehicles travelling ahead of the vehicle and within a threshold distance from the vehicle. Additionally, or alternatively, the information may include one or more of the vehicle speed of the vehicle, and an average speed of vehicles within the vehicle network. Additionally, or alternatively, the information may further include one or more of traffic data, the navigation data and the driving history. Additionally, or alternatively, the threshold may include catalyst light-off temperature.

In another representation, a method may include predicting an engine output profile over a horizon, and in response to catalyst temperature less than a threshold, predict maximum engine temperature achievable over the engine output profile, and if the maximum engine temperature is less than light-off avoid modifying to increase exhaust temperature and modify operation to accommodate no catalytic activity, and otherwise, perform catalyst heating operation. Additionally, or alternatively, the method may further include predicting the maximum engine temperature achievable based on a current driving condition, and a future driving condition of a target vehicle. Additionally, or alternatively, the method may further include determining the current driving condition and the future driving condition based on information relayed within a vehicle network and retrieved from a cloud. Additionally, or alternatively the information may include one or more of a vehicle speed of a target vehicle, and an average speed of other vehicles within the vehicle network. Additionally, or alternatively, the information may further include one or more of a traffic condition, a route and a drive history. Additionally, or alternatively performing catalyst heating operation may include performing one or more of exhaust warm-up actions to increase the exhaust temperature, the warm-up actions including delaying combustion, changing exhaust gas recirculation rate, delaying transmission shift point, and increasing engine load with accessory load. Additionally, or alternatively, not performing the catalytic activity may include not performing one or more of the exhaust warm-up action until the predicted maximum engine temperature rises above the light-off.

Figure 5:
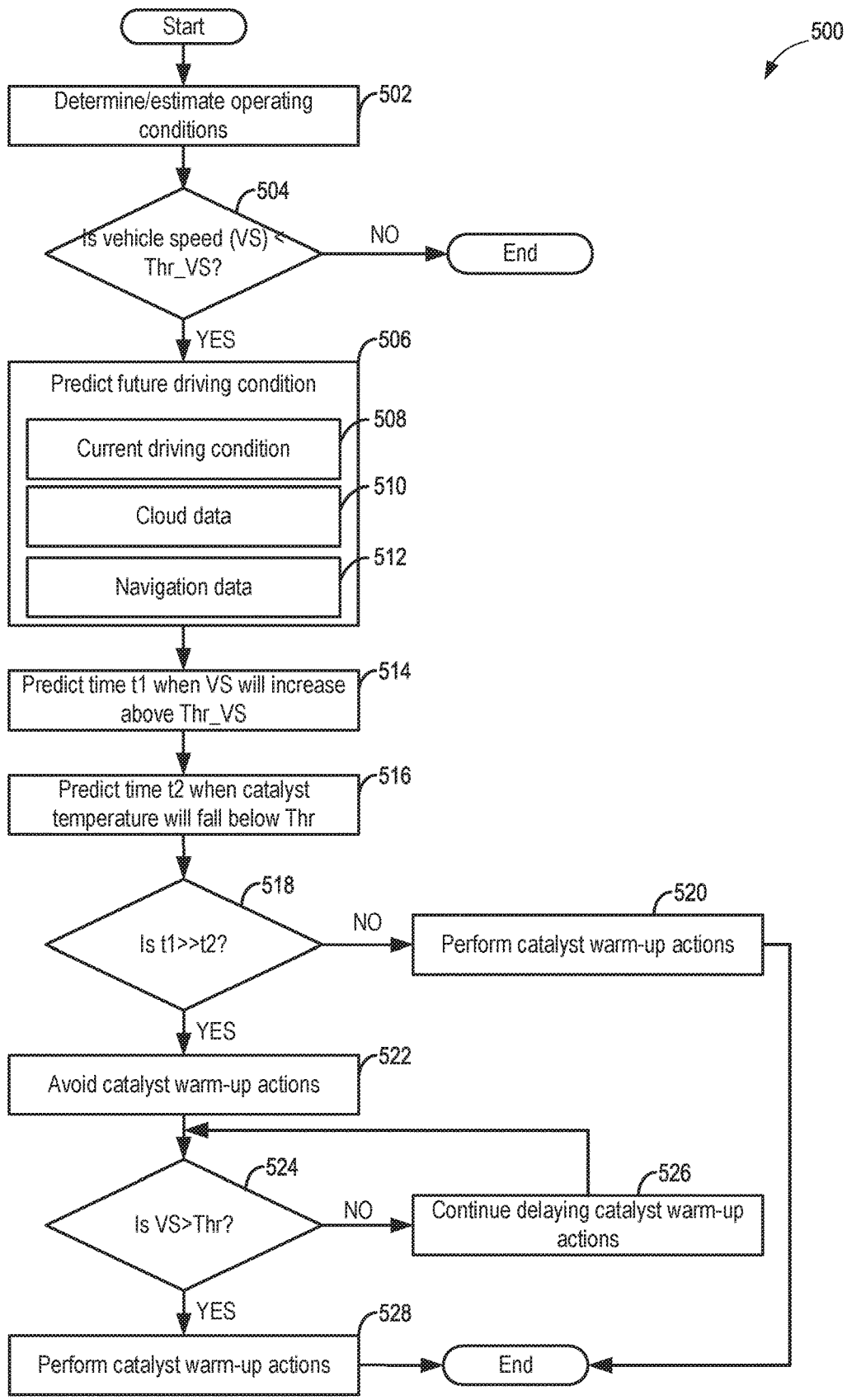
FIG. 5 shows a flow chart illustrating an example method for adjusting catalyst warm-up actions when a vehicle is in extended idle condition.

Turning now to FIG. 5, an example method 500 for avoiding catalyst warm-up actions during an extended idle condition is shown. Specifically, the method detects the extended idle condition based on a current vehicle speed and a predicted future driving condition, and further avoids performing catalyst warm-up actions during the extended idle condition.

Method 500 begins at 502 where vehicle operating conditions are determined and/or estimated. Operating conditions may include engine operating conditions such as engine speed, engine load, intake air flow rate and/or pressure, throttle position, accelerator pedal position, ambient pressure, ambient temperature, vehicle speed, exhaust temperature, and the like. The operating conditions further include load and/or state and temperature of on one or more emission control devices such as three-way catalyst, selective catalytic reduction (SCR) system, lean NOx trap, diesel particulate filter (DPF), oxidation catalyst, and the like.

Next at 504, method 500 determines if the vehicle speed is dropping below a threshold speed Thr_VS. The vehicle speed may be determined from the output of speed sensors in the vehicle, for example. In some examples, deceleration or rate of decrease of vehicle speed may be checked at 504. If the vehicle speed is above the threshold Thr_VS, then method ends.

However, if the vehicle speed is lower than the threshold, then method 500 proceeds to 506 where a future driving condition may be predicted. As such, future driving condition may be predicted by first determining a current driving condition at 508. The current driving condition may include a current location of the vehicle for example. The current location may be determined from data received from GPS, for example. Additionally and/or alternatively, the current driving condition may include determining a current catalyst temperature. As such, the current catalyst temperature may be determined from the output of one or more temperature sensors of the catalyst. In some examples, the current catalyst temperature may be deduced from the exhaust gas temperature. Herein, the catalyst refers to one or more catalysts and also one or more emission storage devices in the exhaust system of diesel, gasoline, hybrid vehicles and the like.

Next, at 510, method 500 includes receiving data from cloud. As such, the cloud may share real-time traffic and road conditions data between vehicles connected in a vehicle-to-vehicle network. Herein, the cloud data may include an average vehicle speed of vehicles within the vehicle network. Further, at 512, navigation data may be retrieved. As such, the navigation data may include a destination deduced based on drive history, for example. Navigation data may additionally and/or alternatively include a preferred route, further deduced from the drive history. As such, the future driving condition may be predicted based on the current driving condition, cloud data and navigation data, all of which may be received concurrently or sequentially. When the average vehicle speed of the vehicles in the network is below a threshold speed for a certain duration of time, the future driving condition may be predicated to be an extended idle condition.

As such, based on a current location and navigation data, a preferred destination and/or route may be determined. Further, the traffic data received from the cloud may show stopped vehicles due to an accident or construction up ahead.

Next at 514, method 500 includes predicting time t1 when the vehicle speed will rise above threshold Thr_VS. Said another way, the time t1 may be the time at which the extended idle condition may be predicted to end. As such, based on the communications within the V2V network, it may be possible to determine when the extended idle condition may end, for example. For example, by communicating with the V2V network, it may be able to predict when the extended idle condition may end, for example, and further determine when the vehicle speed may begin to increase in a certain time, say t1.

Then, method 500 proceeds to 516, where a time t2, at which the catalyst temperature will fall below the threshold Thr (Thr being the light-off temperature of the catalyst) may be predicted. As such, when the vehicle is in extended idle condition, the catalyst temperature may begin to decrease. Herein, a rate at which the catalyst temperature is decreasing may be estimated. Knowing the catalyst light-off temperature, based on the estimated rate of decrease, the time t2 at which the catalyst temperature will fall below the light-off temperature may be predicted.

Method 500 then proceeds to 518, where it may be checked if the predicted time, t1 when vehicle speed will rise above threshold is greater than the predicted time, t2 when the catalyst temperature will fall below Thr. If time t1 is greater than t2, indicating that the catalyst temperature will fall below threshold while the vehicle is still in extended idle condition, then method 500 proceeds to 522 where catalyst warm-up actions may be avoided. As such, when catalyst warm-up actions are performed while the vehicle is in extended idle, the warm-up actions may not be able to increase the catalyst to light-off temperatures, for example. Thus, during such extended idle condition, catalyst warm-up actions may be avoided. However, if time t1 is lesser than time t2, indicating that the extended idle will end before the catalyst temperature falls below the light-off temperature, method 500 proceeds to 520 wherein the catalyst warm-up actions may be performed based on the catalyst temperature. Herein, the catalyst warm-up actions may be able to achieve the light-off temperature and hence the catalyst warm-up actions may be performed and then the method ends.

Retuning to 522, where the catalyst warm-up actions are avoided, the method may proceed to 524 to determine if the vehicle speed is rising above the threshold. As such, if the vehicle speed rises above the threshold, it may indicate that the extended idle condition has ended. If the extended idle condition has ended, then method proceeds to 528 where the catalyst warm-up actions may be performed, otherwise, method 500 proceeds to 526 where the catalyst warm-up actions may be continued to be delayed. In this way, the method may continuously monitor the driving conditions and delay performing the catalyst warm-up actions until more favorable conditions are encountered.

Turning to FIG. 7, plot 700 shows an example relationship between vehicle speed and catalyst temperature. The curve 702 of FIG. 7 shows the vehicle speed and the curve 704 shows the catalyst temperature during different driving conditions. Horizontal dashed line 710 corresponds to a threshold vehicle speed and horizontal dashed line 712 corresponds to threshold catalyst temperature. The X axis represents time and time increases from the left to the right side of the plot. The Y axis of the top plot represents vehicle speed and is the lowest at the bottom of the graph and increases in magnitude towards the top of the plot. Likewise, the Y axis of the bottom plot represents temperature and is the lowest at the bottom of the graph and increases in magnitude towards the top of the plot.

At time t0, the vehicle speed (702) is above the threshold speed (710), and the catalyst temperature (704) is higher than threshold temperature (712). The threshold temperature may be a light-off temperature of the catalyst. Since the catalyst temperature is higher than the light-off temperature, catalyst heating operations may not be initiated.

The time between t1 and t5 represents a first driving condition. Between time t1 and t2, there is a drop in vehicle speed (702), and during this time interval, the vehicle speed drops below the threshold (710). At time t1, when the vehicle speed begins to drop below the threshold speed, a future time t'4 at which the vehicle speed will rise above threshold 710 may be predicted. As explained earlier, the predicted time t'4 may be estimated based on a predicted future driving condition. As such, the future driving condition may be predicted based on one or more of a current driving condition, navigation data, cloud data and drive history. Further, based on a rate of decrease of vehicle speed and a rate of decrease of exhaust temperature, a time t2 at which the catalyst temperature will fall below the threshold 712 may be predicted. As such, first predicted time period or duration T1 for the vehicle speed to rise again threshold may be equal to (t'4−t1) and the second predicted time period or duration T2 for the catalyst temperature to fall below threshold temperature may be equal to (t2−t1).

As one example, when the vehicle speed of a target vehicle falls below threshold at time t1, a current location of the target vehicle may be determined. The current location may be determined based on a signal from the GPS. Further, a future driving condition may be predicted. Based on the navigation data and/or drive history, a preferred route may be determined. Along the preferred route, a V2V communication may be established with a threshold number of vehicles within a threshold distance from the target vehicle, for example. For example, an average speed of vehicles in the vehicle network may be received from the cloud. Based on the average vehicle speed being lower than a threshold, it may be determined that the vehicles in the vehicle network may be stopped ahead. Then, real-time traffic data may be received from the cloud. For example, the traffic data may indicate the due to an accident along the route, there are stopped vehicles ahead. Based on the real-time traffic updates, the time at which the vehicles in the network will start moving will be estimated, and further, the time duration T1 at which the target vehicle's speed will rise above threshold may be predicted. If T1 is longer than a threshold, then it may be determined that the vehicle is in extended idle condition, for example.

When the target vehicle is in extended idle condition, the exhaust temperatures may start to decrease and further the catalyst temperature may also begin to decrease. Based on a rate of decrease of the catalyst temperature (given by slope of curve 704), it may be predicted that the catalyst temperature will fall below the threshold at time t2. Further, the time duration T2 at which the catalyst temperature will fall below the threshold 712 may be predicted. Herein, the threshold may include the light-off temperature of the catalyst and T2 may be equal to (t2−t1).

As such, when the catalyst temperature falls below the threshold, catalyst warm-up or heating actions may be recommended at t3. The dashed curve 706 shows the predicted increase in catalyst temperature if the recommended catalyst heating actions are performed. However, since T1 is greater than T2, the heating actions will not be initiated at time t3 as recommended. This is because, during the extended idle condition, catalyst heating actions may not allow enough heat to get to the exhaust system to light-off the active exhaust components even with the intrusive powertrain heating actions. As such, any action taken to warm the exhaust is wasted because it may not yield the desired emissions reduction implying that fuel economy is reduced and the driver may be negatively impacted for no net benefit. Thus, the catalyst heating actions may be avoided at t3, and the catalyst temperature may be allowed to drop (704).

At time t4, the target vehicle speed starts to rise (plot 702). For example, the accident may have cleared up, and as a result the vehicles along the route may begin to move. At time t4, if the catalyst heating actions are initiated, the catalyst temperature may begin to increase (as shown by dashed curve 708). However, based on cloud data and navigation data, it may be determined that the target vehicle has a short drive ahead, after which another extended idle condition may occur at time t5. For example, the navigation data may indicate that the destination of the target vehicle will arrive within a short distance, at time t5. In another example, the real-time traffic data and V2V communication may further predict another extended idle starting at time t5. In both examples of a short drive to the destination or another predicted extended idle condition, catalyst heating action initiated at time t4 will not be able to heat up the catalyst to the threshold temperature. This is shown by dashed curve 708, wherein the catalyst temperature fails to reach the threshold before the time t5, and hence the catalyst warm-up actions may be further delayed until more favorable drive conditions are predicted.

In this way, based on communication with the cloud and further to vehicles in a network of vehicles, it may be possible to adjust catalyst heating actions, and only perform the actions when there is possibility of the catalyst to reach up to light-off temperatures within the drive cycle, for example.

Another example drive condition is shown between time t6 and t7. At time t7, there is a drop in vehicle speed (702), and during this time interval, the vehicle speed drops below the threshold (710). At time t7, when the vehicle speed begins to drop below the threshold speed, a future time t'9 at which the vehicle speed will rise above threshold 710 may be predicted. As explained earlier, the predicted time t'9 may be estimated based on a predicted future driving condition. As such, the future driving condition may be predicted based on one or more of a current driving condition, navigation data, cloud data and drive history. Further, based on a rate of decrease of vehicle speed and a rate of decrease of exhaust temperature, a time t8 at which the catalyst temperature will fall below the threshold 712 may be predicted. As such, first predicted time period or duration T1 for the vehicle speed to rise again threshold may be equal to (t'9–t7) and the second predicted time period or duration T2 for the catalyst temperature to fall below threshold temperature may be equal to (t7–t6).

When the vehicle speed of a target vehicle falls below threshold at time t7, a current location of the target vehicle may be determined. The current location may be determined based on a signal from the GPS. Further, a future driving condition may be predicted. Based on the navigation data and/or drive history, a preferred route may be determined. Along the preferred route, a V2V communication may be established with a threshold number of vehicles within a threshold distance from the target vehicle, for example. For example, an average speed of vehicles in the vehicle network may be received from the cloud. Based on the average vehicle speed being lower than a threshold, it may be determined that the vehicles in the vehicle network may be stopped ahead. Then, real-time traffic data may be received from the cloud. For example, the traffic data may indicate the due to a construction along the route, there is slow moving traffic ahead. Based on the real-time traffic updates, the time at which the vehicles in the network will start moving at threshold speeds will be estimated, and further, the time duration T1 at which the target vehicle's speed will rise above threshold may be predicted. However, T1 may be lower than the threshold, and it may be determined that the vehicle is not in extended idle condition, but going through slow moving traffic, for example.

When the target vehicle is in stop and go, slow moving traffic, the exhaust temperatures may start to decrease and further the catalyst temperature may also begin to decrease. Based on a rate of decrease of the catalyst temperature (given by slope of curve 704), it may be predicted that the catalyst temperature will fall below the threshold at time t7. Further, the time duration T2 (t7–t6) at which the catalyst temperature will fall below the threshold 712 may be predicted. Herein, the threshold may include the light-off temperature of the catalyst.

As such, when the catalyst temperature falls below the threshold, catalyst warm-up or heating actions may be recommended at t8. In some example, the catalyst heating actions may be recommended at t7. The dashed curve 714 shows the predicted increase in catalyst temperature if the recommended catalyst heating actions are performed. Though T1 is greater than T2, but T1 is however lower than the threshold that may corresponds to extended idle condition, say, the heating actions may be initiated at time t8 as recommended. This is because, during the slow moving condition, catalyst heating actions may allow enough heat to get to the exhaust system to light-off the active exhaust components. As such, the heating action taken to warm the exhaust is not wasted because it will yield the desired emissions reduction. Thus, the catalyst heating actions may be performed at t8, and the catalyst temperature may be allowed to increase (714).

Based on cloud data and navigation data, it may be determined that the speed of the target vehicle will increase above threshold at t'9. For example, the navigation data may indicate that an end of construction zone, and speeds of the vehicles in the vehicle network increasing above threshold. Thus, initiating the catalyst heating actions at t8, will allow the catalyst to warm-up to catalyst light-off temperature at t9, for example.

In this way, based on communication with the cloud and further to vehicles in a network of vehicles, it may be possible to adjust catalyst heating actions, and only perform the actions when there is possibility of the catalyst to reach up to light-off temperatures within the drive cycle, for example.

Another example drive condition is shown between time t11 and t14. At time t11, there is a drop in vehicle speed (702), and the vehicle speed drops below the threshold (710) at time t12. At time t11, when the vehicle speed begins to drop below the threshold speed, a future time t'12 at which the vehicle speed will rise above threshold 710 may be predicted. As explained earlier, the predicted time t'12 may be estimated based on a predicted future driving condition. As described earlier, the future driving condition may be predicted based on one or more of a current driving condition, navigation data, cloud data and drive history. Further, based on a rate of decrease of vehicle speed and a rate of decrease of exhaust temperature, a time t12 at which the catalyst temperature will fall below the threshold 712 may be predicted. As such, first predicted time period or duration T1 for the vehicle speed to rise again threshold may be equal to (t'12−t12) and the second predicted time period or duration T2 for the catalyst temperature to fall below threshold temperature may be equal to (t13−t12).

When the vehicle speed of a target vehicle falls below threshold at time t12, a current location of the target vehicle may be determined. The current location may be determined based on a signal from the GPS. Further, a future driving condition may be predicted. Based on the navigation data and/or drive history, a preferred route may be determined. Along the preferred route, a V2V communication may be established with a threshold number of vehicles within a threshold distance from the target vehicle, for example. For example, an average speed of vehicles in the vehicle network may be received from the cloud. Based on the average vehicle speed being lower than a threshold, it may be determined that the vehicles in the vehicle network may be travelling at lower speeds, which may be predicted to last only for a short duration, based on real-time traffic data, for example. Based on the real-time traffic updates, the time at which the vehicles in the network will start moving at threshold speeds will be estimated, and further, the time duration T1 at which the target vehicle's speed will rise above threshold may be predicted. However, T1 may be lower than the threshold duration for extended idle condition for example, and it may be determined that the vehicle is not in extended idle condition, but going through slow moving traffic.

When the target vehicle is in stop and go, slow moving traffic, the exhaust temperatures may start to decrease and further the catalyst temperature may also begin to decrease. Based on a rate of decrease of the catalyst temperature (given by slope of curve 704), it may be predicted that the catalyst temperature will fall below the threshold at time t12. Further, the time duration T2 (t13−t12) at which the catalyst temperature will fall below the threshold 712 may be predicted. Herein, the threshold may include the light-off temperature of the catalyst.

As such, when the catalyst temperature falls below the threshold, catalyst warm-up or heating actions may be recommended at t8. In some example, the catalyst heating actions may be recommended at t7. Since T2 is longer than T1, catalyst actions may be performed. Thus, the catalyst heating actions may be performed at t'12, and the catalyst temperature may be allowed to increase (704).

In this way, based on communication with the cloud and further to vehicles in a network of vehicles, it may be possible to adjust catalyst heating actions, and perform the actions when there is possibility of the catalyst to reach up to light-off temperatures within the drive cycle, for example.

Thus, an example method for a vehicle, includes in response to a vehicle speed dropping below a threshold speed, avoiding exhaust warm-up actions when a first predicted time for the vehicle speed to rise above the threshold speed is longer than one or more of a second estimated time for a catalyst temperature to fall below a threshold temperature and a threshold duration, and performing the exhaust warm-up actions when the first time is shorter than the second time. Additionally, or alternatively, the method may further include determining the first predicted time based on a current driving condition and a predicted future driving condition. Additionally, or alternatively, the method may include determining the current driving condition and the predicted future driving condition based on data retrieved from a cloud. Additionally, or alternatively, the method may include determining the first predicted time based on one or more of navigation data and traffic data. Additionally, or alternatively, the threshold temperature may include a light-off temperature of a catalyst and the threshold duration may include an extent of an extended idle drive condition.

Figure 6:
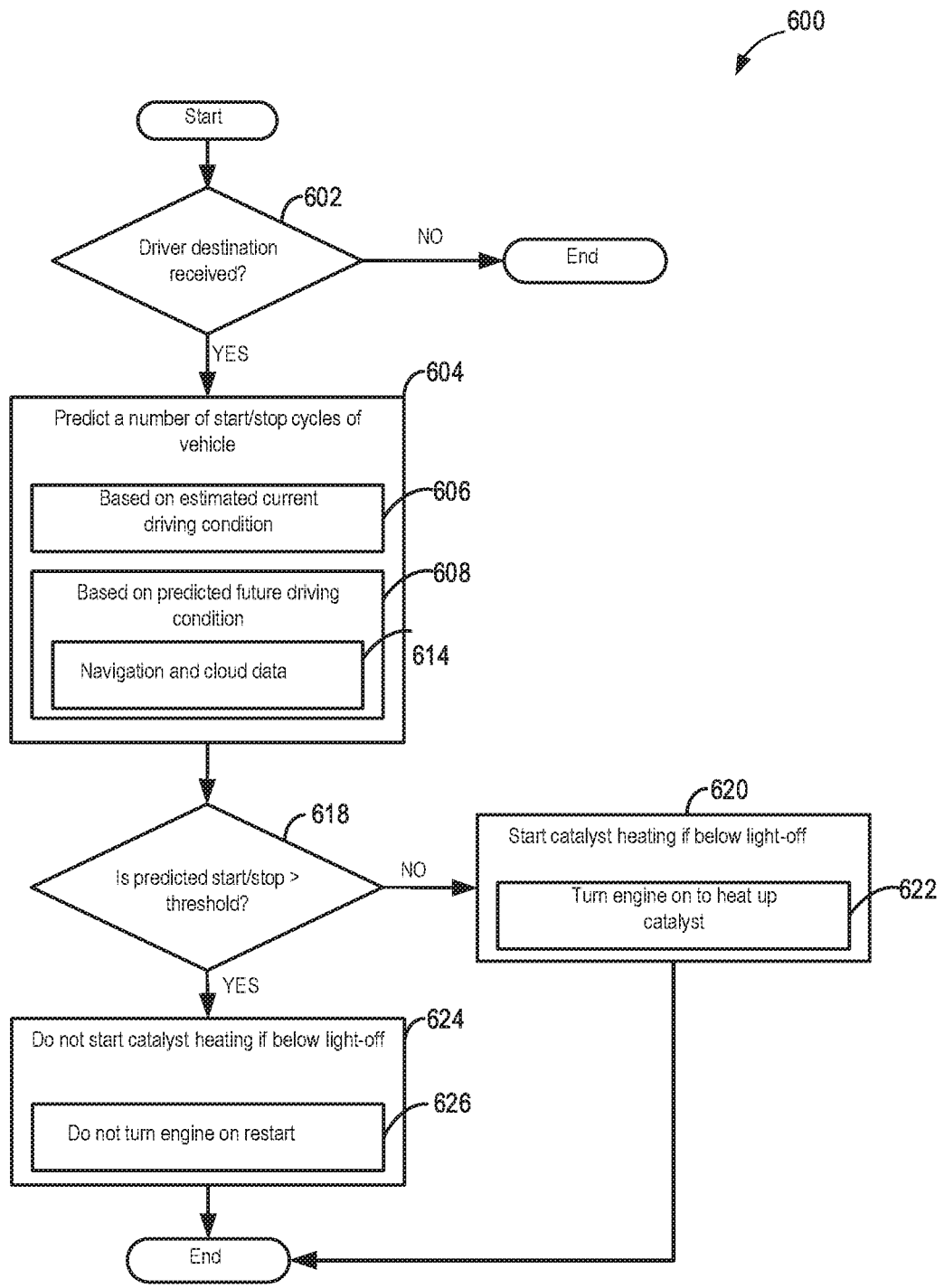
FIG. 6 shows a flow chart illustrating an example method for adjusting catalyst heating based on destination input received from a driver of the hybrid electric vehicle and a predicted start/stop of the vehicle.

Turning now to FIG. 6, an example method 600 for starting catalyst heating based on destination input received from a driver of the hybrid electric vehicle and a predicted start/stop of the vehicle is shown. Specifically, method 600 includes starting catalyst heating when the predicted start/stop is below a threshold number, and not starting the catalyst heating otherwise.

Method 600 begins at 602 where it is determined if a driver destination is received. In some examples, receiving drive destination may include a driver entering a destination in a GPS, for example. In some other examples, the driver destination may be inferred based on drive history. If driver destination is not received, then method ends.

If driver destination is received at 602, then method proceeds to 604, where a number of start/stop cycles of the vehicle may be predicted. In hybrid electric vehicles, during start-stop cycle of the vehicle, the engine may be automatically shut-down and be restarted to reduce the amount of time the engine spends idling, thereby reducing fuel consumption and emissions. Predicting the number of start/stop cycles of the vehicle may be based on a current driving condition estimated at 606 and further based on a future driving condition predicted at 608. As such, estimating a current driving condition includes estimating one or more of a current vehicle location, a current speed, and the like. Predicting the future driving condition may further include receiving navigation and cloud data at 614, and predicting the future driving condition based on the received data. For example, the navigation data may include a route generated based on the destination input received at 602. Data received from the cloud may include real-time traffic and road conditions and further include data (such as average vehicle speed of vehicles in the network) transceived between vehicles connected in a vehicle-to-vehicle network. Herein, the data retrieved from the cloud may include a preview of upcoming traffic conditions, types of roads, accidents along the route, stalled or stopped vehicles, number of traffic lights, and the like.

Next, method proceeds to 618 where it is determined if the predicted number of start/stop cycles of the vehicle is higher than a threshold number. If "YES", then method 600 proceeds to 624 where the catalyst heating may not be started when the catalyst temperature is below light-off, for example. Herein, not starting the catalyst heating may include not starting the engine on restart at 626 and the method ends.

However, if the predicted number of start/stop cycles of the vehicle is lower than the threshold, then method 600 proceeds to 620 where the catalyst heating may be started when the catalyst temperature falls below light-off, for example. Herein, starting the catalyst heating may include starting the engine on restart at 626, and the method ends.

For example, controller 12 may identify and/or control the amount of electrical energy stored at the energy storage device, which may be referred to as the state of charge (SOC). Turning to FIG. 8, plot 800 shows an example relationship between a state of charge (SOC) of an energy storage device in a hybrid electric vehicle, combustion engine in the hybrid electric vehicle and a catalyst temperature. The curve 802 of FIG. 8 shows the SOC, the curve 804 shows the engine turning ON and OFF, and the curve 806 shows the catalyst temperature of the catalyst in the exhaust system of the engine. Horizontal dashed line 808 corresponds to a threshold charge and horizontal dashed line 810 corresponds to threshold catalyst temperature. The X axis represents time and time increases from the left to the right side of the plot. The Y axis of the top plot represents amount of charge and is the lowest at the bottom of the graph and increases in magnitude towards the top of the plot. Likewise, the Y axis of the bottom plot represents temperature and is the lowest at the bottom of the graph and increases in magnitude towards the top of the plot.

At time t0, the engine of the HEV may be OFF (804) and the catalyst temperature (806) may be higher than a threshold (810), for example. Herein, the HEV may be operated in charge depleting mode. During the charge depleting mode the HEV operation may be dependent on energy or SOC of the battery pack. As an example, the HEV may operate in charge depleting mode at startup, and switch to charge-sustaining mode after the battery has reached its minimum SOC threshold.

At time t1, a destination input may be received from a driver of the HEV, for example. As explained earlier, receiving destination input may include the driver entering a destination in a GPS, for example. In some examples, the destination may be inferred based on drive history.

Based on the destination received at time t1, a number of start/stop may be predicted. Thus, between t1 and t2, the number of start/stop may be predicted. However, to predict the number of start stop, a current driving condition may be determined. The current driving condition may include a current location of the vehicle as determined based on signal from a GPS, for example. Further, based on the destination a future driving condition may be predicted. Predicating the future driving condition may include generating a preferred route. Within the preferred route, a network of vehicles may be selected and external communication may be established between the vehicles in the network and a cloud. For example, the network may include a fleet of vehicles at a threshold distance ahead of the target vehicle, for example. Furthermore, real-time traffic and road conditions may be retrieved from the cloud. Based on each of the current driving condition and the future driving conditions, the number of start/stop of the vehicle may be predicted.

In an example scenario, at t1, it may be determined that the vehicle is in a busy stretch of road with greater than threshold number of traffic lights. Further, based on the time of the day, it may be determined that the traffic lights may stay on for longer times. Thus, it may be predicted that the vehicle may encounter greater than threshold number of start/stops between time t1 and t2.

At time t1, the catalyst temperature (806) is below threshold (810). In one example, the threshold may include the light-off temperature of the catalyst. However, catalyst warm-up actions may be delayed, since the predicted number of start/stop is greater than the threshold number. Additionally, since the SOC is higher than the threshold charge (808), the engine may be continued to be OFF between t1 and t2. Thus, the catalyst temperature will be allowed to fall below threshold and the engine may not be turned ON to heat up the catalyst to light-off temperatures.

Another example drive condition is shown between t3 and t7. At time t3, a destination input may be received from a driver of the HEV, for example. As explained earlier, receiving destination input may include the driver entering a destination in a GPS, for example. In some examples, the destination may be inferred based on drive history.

Further, a current driving condition and a future driving condition may be determined at time t1. The future driving condition, as determined by establishing communications with a network of vehicles and a cloud, may predict a steep uphill for a long duration between time t4 and t6. At t4, the catalyst temperature falls below threshold temperature. However, between t4 and t5, the SOC (802) is higher than the threshold charge (808), and hence the engine may be continued to be OFF between t4 and t5, and the catalyst temperature may be allowed to decrease.

At time t5, the SOC may reach threshold charge. If the engine is not turned ON, then the SOC may continue to drop as shown by dashed curve 812. In order to avoid the SOC falling below the threshold, the engine may be turned ON at t5, and continued to be ON for the time between t5 and t7. Herein, turning ON the engine will increase the catalyst temperature, and the catalyst temperature may rise above threshold. The engine may be turned OFF at t7, when both the SOC is above threshold charge and the catalyst temperature is above light-off, for example.

Thus, an example method for a hybrid vehicle, includes in response to receiving a destination, predicting a number of start-stop cycle in a route of the vehicle, not starting engine on restart when catalyst temperature is below light-off when the number of start-stop cycle is higher than a threshold number, and starting the engine on restart when catalyst temperature is below light-off when the number of start-stop cycle is lower than the threshold number. Additionally, or alternatively, the method may further include predicting a duration between the start-stop cycle of the vehicle, and not starting the engine on restart when catalyst temperature is below light-off when the duration is lower than a threshold duration. Additionally, or alternatively, the method may further include starting the engine on restart when catalyst temperature is below light-off when the duration is higher than the threshold duration. Additionally, or alternatively, the method may further include predicting the duration between a start-stop cycle of the vehicle and the number of start-stop cycle based on a current location of the vehicle, and navigation data and further based on cloud data from a vehicle to vehicle network. Additionally, or alternatively, the method may further include adjusting the starting of the engine based on a state of charge of a battery of the vehicle. Additionally, or alternatively, the start-stop cycle may include a single vehicle-on, and engine-run and a vehicle-off with lower than threshold engine-run.

In this way, by anticipating drive conditions wherein the exhaust may not be warmed up to operating temperature, intrusive exhaust warm-up actions may be delayed or stopped until a more favorable drive conditions occur. Thus, driver experience may be enhanced and further cost of heating may be reduced. The technical effect of delaying the exhaust warm-up actions based on the predicated drive conditions, is that an optimal strategy may be devised that continuously monitors fuel cost of heating and the impact to the driver versus delaying catalyst heating until more favorable conditions exist.

The systems and methods described above also provide for a method, the method comprising adjusting catalyst heating actions in response to an expected decrease in temperature of a catalyst of a vehicle below a threshold and an estimated duration thereof based on communications external from the vehicle, including: delaying the actions based on the actions determined to be unable to achieve the threshold within the duration, and enabling the actions based on the actions determined to be able to achieve the threshold within the duration. In a first example of the method, the method may additionally or alternatively include estimating the duration based on each of a current vehicle condition, and a future driving condition, the future driving condition determined based on the communications. A second example of the method optionally includes the first example, and further includes determining the current vehicle condition based on data retrieved from a navigational database of the vehicle and a driving history. A third example of the method optionally includes one or more of the first and the second examples, and further includes wherein the communications include information relayed within a vehicle network and information retrieved from a cloud. A fourth example of the method optionally includes one or more of the first through the third examples, and further includes wherein vehicle network includes one or more vehicles travelling ahead of the vehicle and within a threshold distance from the vehicle. A fifth example of the method optionally includes one or more of the first through the fourth examples, and further includes wherein the information includes one or more of the vehicle speed of the vehicle, and an average speed of vehicles within the vehicle network. A sixth example of the method optionally includes one or more of the first through the fifth examples, and further includes wherein the information further includes one or more of traffic data, the navigation data and the driving history. A seventh example of the method optionally includes one or more of the first through the sixth examples, and further includes wherein the threshold includes catalyst light-off temperature.

The systems and methods described above also provide for a method, the method comprising in response to a vehicle speed dropping below a threshold speed, avoiding exhaust warm-up actions when a first predicted time for the vehicle speed to rise above the threshold speed is longer than one or more of a second estimated time for a catalyst temperature to fall below a threshold temperature and a threshold duration, and performing the exhaust warm-up actions when the first time is shorter than the second time. In a first example of the method, the method may additionally or alternatively includes determining the first predicted time based on a current driving condition and a predicted future driving condition. A second example of the method optionally includes the first example, and further includes determining the current driving condition and the predicted future driving condition based on data retrieved from a cloud. A third example of the method optionally includes one or more of the first and the second examples, and further includes wherein determining the first predicted time based on one or more of navigation data and traffic data. A fourth example of the method optionally includes one or more of the first through the third examples, and further includes wherein the threshold temperature includes a light-off temperature of a catalyst. A fifth example of the method optionally includes one or more of the first through the fourth examples, and further includes wherein the threshold duration includes an extent of an extended idle drive condition.

The systems and methods described above also provide for a system for a hybrid vehicle, the system comprising an engine coupled to an exhaust aftertreatment, an energy storage device configured to store energy, and a controller comprising a computer readable storage medium comprising instructions that are executed to in response to receiving a destination, predicting a number of start-stop cycle in a route of the vehicle, not starting engine on restart when catalyst temperature is below light-off when the number of start-stop cycle is higher than a threshold number, and starting the engine on restart when catalyst temperature is below light-off when the number of start-stop cycle is lower than the threshold number. In a first example of the system, the system may additionally or alternatively include a navigation system in communication to a network of vehicles and a cloud and wherein the instructions are further executed to predict a duration between the start-stop cycle of the vehicle based on data received from the navigation system, and not starting the engine on restart when catalyst temperature is below light-off when the duration is lower than a threshold duration. A second example of the system optionally includes the first example and further wherein the instructions are further executed to start the engine on restart when catalyst temperature is below light-off when the duration is higher than the threshold duration. A third example of the system optionally includes one or more of the first and the second examples, and further includes wherein the instructions are further executed to predict the duration between a start-stop cycle of the vehicle and the number of start-stop cycle based on a current location of the vehicle, and navigation data and further based on cloud data from the network of vehicles. A fourth example of the system optionally includes one or more of the first through the third examples, and further includes wherein the instructions are further executed to adjust the starting of the engine based on a state of charge of the energy storage device of the vehicle. A fifth example of the system optionally includes one or more of the first through the fourth examples, and further includes wherein the start-stop cycle includes a single vehicle-on, and engine-run and a vehicle-off with lower than threshold engine-run.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, 1-4, 1-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for a hybrid vehicle, comprising:
   an engine coupled to an exhaust aftertreatment;
   an energy storage device configured to store energy; and
   a controller comprising a computer readable storage medium comprising instructions that are executed to:
      in response to receiving a destination, predicting a number of start-stop cycles in a route of the vehicle;
      not starting the engine on restart when catalyst temperature is below light-off when the number of start-stop cycles is higher than a threshold number; and
      starting the engine on restart when the catalyst temperature is below light-off when the number of start-stop cycles is lower than the threshold number.

2. The system of claim 1, further comprising a navigation system in communication with a network of vehicles and a cloud and wherein the instructions are further executed to predict a duration between start-stop cycles of the vehicle based on data received from the navigation system, and not starting the engine on restart when the catalyst temperature is below light-off when the duration is lower than a threshold duration.

3. The system of claim 2, wherein the instructions are further executed to start the engine on restart when the catalyst temperature is below light-off when the duration is higher than the threshold duration.

4. The system of claim 2, wherein the instructions are further executed to predict the duration between start-stop cycles of the vehicle and the number of start-stop cycles based on a current location of the vehicle, and navigation data and further based on cloud data from the network of vehicles.

5. The system of claim 1, wherein the instructions are further executed to adjust the starting of the engine based on a state of charge of the energy storage device of the vehicle.

6. The system of claim 2, wherein a start-stop cycle includes a single vehicle-on, and engine-run and a vehicle-off with lower than threshold engine-run.

* * * * *